United States Patent [19]
Suzuki

[11] 3,733,827
[45] May 22, 1973

[54] ANTI-POLUTION DEVICE FOR COMBUSTION ENGINE EXHAUST GASES

[76] Inventor: Ken Suzuki, 1360 Ainapua St., Honolulu, Hawaii 96819

[22] Filed: Feb. 3, 1972

[21] Appl. No.: 223,125

[52] U.S. Cl..................................60/278, 123/119 A
[51] Int. Cl. ....................F02b 75/10, F02m 25/06
[58] Field of Search...........................60/278, 279; 123/119 A

[56] References Cited

UNITED STATES PATENTS

| | | | |
|---|---|---|---|
| 1,476,942 | 12/1923 | Youngblood | 123/119 A |
| 3,035,561 | 5/1962 | Siegler | 60/278 |
| 3,476,524 | 11/1969 | Burke | 60/278 |
| 3,645,098 | 2/1972 | Templin | 60/278 |
| 3,699,683 | 10/1972 | Tourtellotte | 60/278 |

Primary Examiner—Douglas Hart
Attorney—Arthur E. Dowell, Jr. et al.

[57] ABSTRACT

An anti-polution device for combustion engine exhaust gases in which the toxic elements of the exhaust gases are removed as much as possible through an exhaust gas cleaner which is connected with the exhaust pipe of the engine and is also connected to the carburetor air regulator of the engine on its suction side. The exhaust gases thus purified through the exhaust gas cleaner and the carburetor air regulator are mixed with air by the sucking force of the engine and are sent into the combustion chamber of the engine for recombustion of the same therein.

8 Claims, 5 Drawing Figures

Patented May 22, 1973

ANTI-POLUTION DEVICE FOR COMBUSTION ENGINE EXHAUST GASES

DESCRIPTION OF THE INVENTION

This invention covers an anti-polution device which controls the mixture of exhaust gas of the combustion engine and air for recombustion of the exhaust gas. The removal of elements such as hydrocarbon, carbon monoxide, and other toxic elements from the exhaust gas of combustion engines has heretofore been attempted but no practical device has as yet been put into actual use. The solution of the exhaust gas problems has been regarded as of prime importance in controlling environmental polution.

The principal objects of my invention are to provide a practical device in which the volume of hydrocarbon, carbon monoxide, and other toxic contents in the engine exhaust gas are reduced; the exhaust gas temperature is raised; and the exhaust gas is mixed with a large volume of air and sent into combustion chamber for re-burning. My device has fewer parts, requires less adjustment, is easily mounted onto a new or an old car, and is of light weight and low price.

I will explain the invention with reference to the accompanying drawings, which illustrate one practical embodiment thereof to enable others familiar with the art to adopt and use the same; and will summarize in the claims the novel features of construction, and novel combinations of parts, for which protection is desired.

Figure 1:
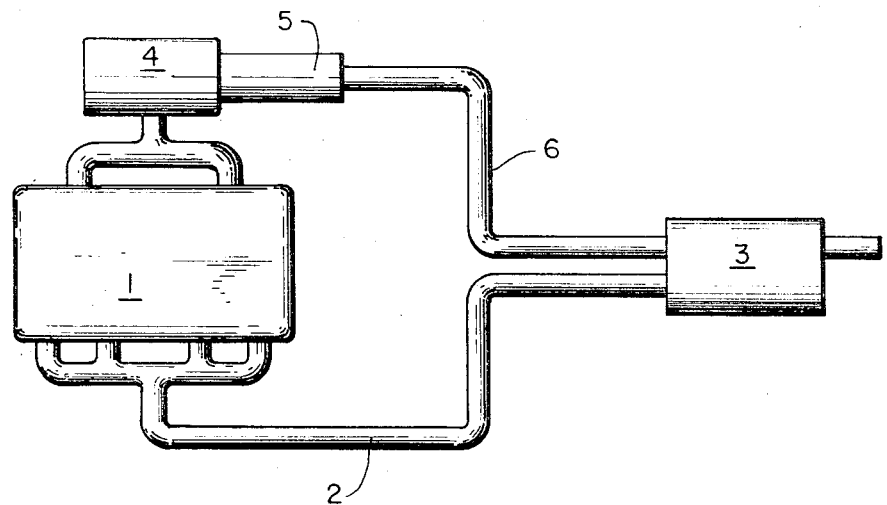
FIG. 1 is an assembly view of an internal combustion engine showing my novel exhaust gas cleaner connected into the exhaust pipe of an internal combustion engine, and also connected to the carburetor air regulator on the suction side of the internal combustion engine.

The exhaust gases, containing hydrocarbon, carbon monoxide, and other toxic contents can be made harmless by completely burning them, but in order to effect the complete combustion of the exhaust gas a greater volume of oxygen or air than the volume required by the chemical computations has to be supplied. Exhaust gas cleaner 3 is attached to exhaust pipe 2 of a conventional combustion engine 1, as shown in FIG. 1. An air regulator 5 is attached to a carburetor air cleaner 4 located on the suction side of the said combustion engine 1. Air regulator 5 is also connected to the said exhaust gas cleaner 3 through suction pipe 6.

Figure 2:
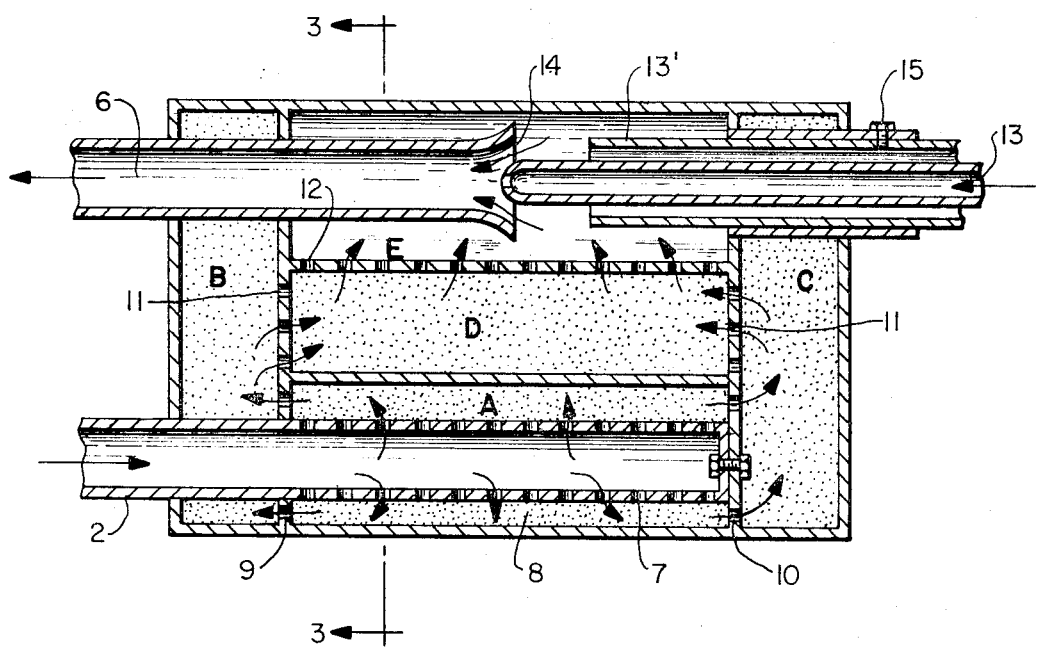
FIG. 2 is an enlarged longitudinal section through the exhaust gas cleaner shown in FIG. 1, detached.
Figure 3:
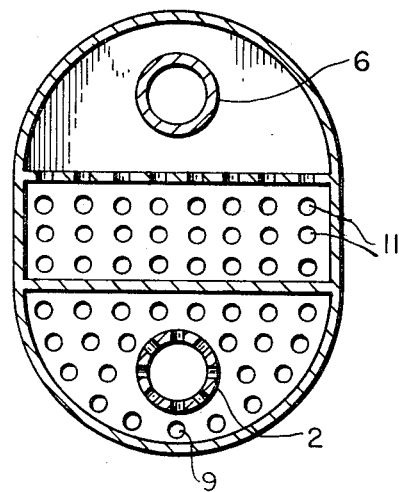
FIG. 3 is a transverse section on the line 3—3, FIG. 2.
Figure 4:
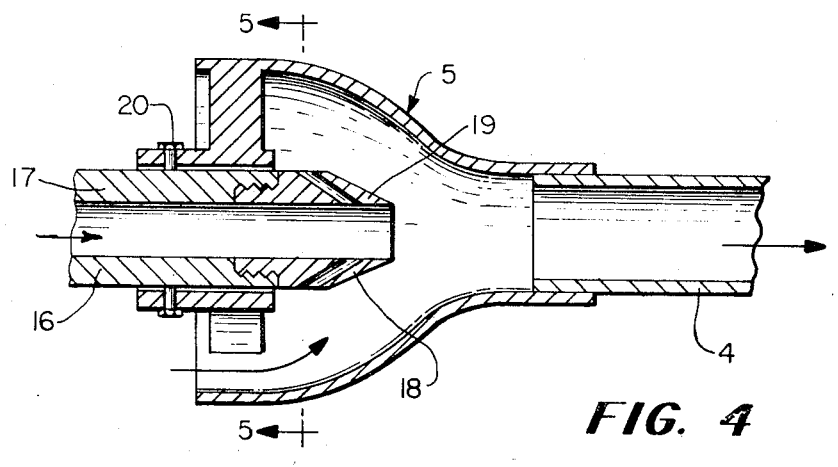
FIG. 4 is a longitudinal section through the air regulator, detached.
Figure 5:
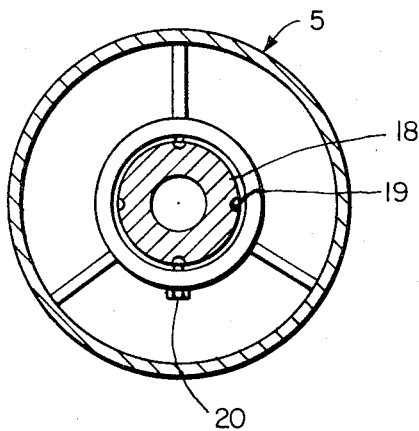
FIG. 5 is a section on the line 5—5, FIG, 4.

The said exhaust gas cleaner 3 is illustrated in detail in FIGS. 2 and 3, while the said air regulator 5 is illustrated in FIGS. 4 and 5; and with reference to these drawings, the function of the invention will be described hereunder.

The exhaust gas discharged from the combustion engine 1 through pipe 2 enters into exhaust gas cleaner 3 which is built-in inside a common muffler, and is jetted into chamber A thereof through many holes 7 (FIG. 2) made in exhaust pipe 2. The exhaust gas reaches a high temperature due to its heat and to the activated carbon 8 sealed in chamber A. After passing through chamber A, the exhaust gas is discharged therefrom into chambers B and C through holes 9 and 10. Chambers B and C are also filled with activated carbon 8. In chambers B and C, toxic elements, etc., are absorbed by the activated carbon and the exhaust noise is also suppressed. After being cleaned in chambers B and C, the exhaust gas passes through hole 11 into chamber D which is also filled with activated carbon 8, where it undergoes the same purifying process as before and enters into chamber E through holes 12.

Within chamber E is a venturi 14 formed by the ends of pipes 6 and 13 (FIG. 2) so that the exhaust gas in chamber E is mixed with the air sucked through pipe 13 and passes through pipe 6 to the engine carbureter by the sucking force of the combustion engine 1. Pipe 13 is interconnected with an outer spaced pipe 13' open to the atmosphere and can be adjusted by means of it. By this structure, the mixing ratio between exhaust gas and air can be regulated and set by fastening bolt 15. During the idling of the engine 1, a small volume of exhaust gas in chamber E is discharged through the passageway provided between pipes 13 and 13'. During the high-speed running of the engine, however, outside air is sucked by the suction of the engine through pipe 13, and being mixed with exhaust gas in chamber E at venturi 14, it is sucked into pipe 6 leading to the carburetor.

The exhaust gas, in chamber E, thus cleaned through exhaust gas cleaner 3, is sucked with air from the atmosphere to carburetor air regulator 5. The structure of air regulator 5 is shown in FIGS. 4 and 5, same having a jet 16 connected to suction pipe 6. Jet 16 is composed of a pipe 17 and a jet cap 18 which incorporates four nozzles 19. This air regulator 5 functions as a venturi tube by the sucking force of the engine to mix the exhaust gas, already once mixed with air, the second time with air through the nozzles 19 of the jet cap 18 so as to prepare the mixture of exhaust gas and air into a more combustible conditions. Further mixed with air by air regulator 5, the exhaust gas goes through carburetor air cleaner 4, and is mixed with engine fuel, and is sucked through the carburetor into the engine combustion chamber, where it is burned. Jet 16 has an adjustable structure, and can be set by fastening bolt 20 at an optimal position.

Accordingly, the exhaust gas, which is mixed with air in carburetor air cleaner 4 and again in air regulator 5 in a volume necessary for complete combustion, becomes harmless as it undergoes recombustion.

Although a small volume of exhaust gas is discharged outside during the idling of the engine, the volume is far below the specified volume limit of exhaust gas under the exhaust gas regulations. During high-speed running of the engine, the exhaust gas is scarcely discharged outside.

The merits of this invention is summarized as follows:
1. Toxic gas is controlled by the complete combustion of the fuel.
2. Carbon is not deposited in the engine due to the cleaning effect of the complete combustion of fuel.
3. Fuel can be considerably saved.
4. The power of the engine can be increased, and the acceleration is smooth.
5. The compressibility is heightened so that the use of high-octane gasoline is not necessary.
6. Lead is completely removed from the fuel.

7. Adverse effects of residual gas inside the engine are eliminated, and the problem of engine overheat is prevented.
8. Engine noise is nearly completely suppressed so that any car provided with this device runs as noiselessly as a high-class car.
9. Especially in the case of a diesel engine, the device is remarkably conducive to complete combustion, power-up of engine, noise suppression, and fuel economization.
10. A car provided with this device can run with inferior fuel as efficiently as with high-octane gasoline.

I claim:

1. An anti-polution device for combustion engines having an exhaust pipe and a carburetor air regulator, comprising an exhaust gas cleaner having a first chamber receiving the discharge from the exhaust pipe; a series of second chambers communicating with and receiving in succession the exhaust gas from the first chamber; said first and second chambers containing activated carbon; a third chamber receiving the exhaust gas from the said second chambers; a venturi in said third chamber leading to the said air regulator; an air pipe extending into the third chamber for directing air into the mouth of the venturi; means in said third chamber for permitting escape of exhaust gas from the third chamber to the atmosphere when the engine is idling; and means in the air regulator for further mixing the exhaust gas from the third chamber with air, whereby the exhaust gas purified in the exhaust gas cleaner is mixed with air in the said cleaner and in said air regulator and drawn by the sucking force of the engine into the combustion chambers of the engine for recombustion therein.

2. In a device as set forth in claim 1, said mixing means comprising a second venturi having an adjustable jet cap provided with a plurality of air nozzles disposed therearound.

3. In a device as set forth in claim 1, said air pipe and outer pipe being adjustable toward the mouth of the venturi.

4. In a device as set forth in claim 1, said exhaust gas cleaner comprising a closed casing surrounding a perforated end of the exhaust pipe; and said series of second chambers being formed by vertical walls spaced from the ends of the casing and by other horizontal walls disposed between the first walls intermediate the exhaust pipe and venturi; said walls having perforations therein interconnecting the second series of chambers to cause the exhaust gas to flow therethrough in succession.

5. An anti-polution device for a combustion engine having an exhaust pipe and a carburetor air regulator, comprising an exhaust gas cleaner having a first chamber receiving the dischange from the engine exhaust pipe; a series of second chambers communicating with and receiving in succession the exhaust gas from the first chamber; said first and second chambers containing activated carbon; a third chamber receiving the exhaust gas from the said second chambers; a venturi in said third chamber leading to the said air regulator; an air pipe extending into the third chamber and terminating adjacent the mouth of the venturi; an outer pipe surrounding and spaced from the air pipe permitting escape of exhaust gas from the third chamber to the atmosphere when the engine is idling; and means in the air regulator for further mixing the exhaust gas from the third chamber with air, whereby the exhaust gas purified in the exhaust gas cleaner is mixed with air in the said cleaner and in said air regulator and drawn by the sucking force of the engine into the combustion chambers of the engine for recombustion therein.

6. In a device as set forth in claim 5, said means comprising a second venturi having an adjustable jet cap provided with a plurality of air nozzles disposed therearound.

7. In a device as set forth in claim 5, said air pipe and outer pipe being adjustable towards the mouth of the venturi.

8. In a device as set forth in claim 5, said exhaust gas cleaner comprising a closed casing surrounding a perforated end of the exhaust pipe; and said series of second chambers, being formed by vertical walls spaced from the ends of the casing and by other horizontal walls disposed between the first walls intermediate the exhaust pipe and venturi; said walls having perforations therein interconnecting the series of second chambers to cause the exhaust gas to flow therethrough in succession.

* * * * *